Patented Aug. 26, 1930

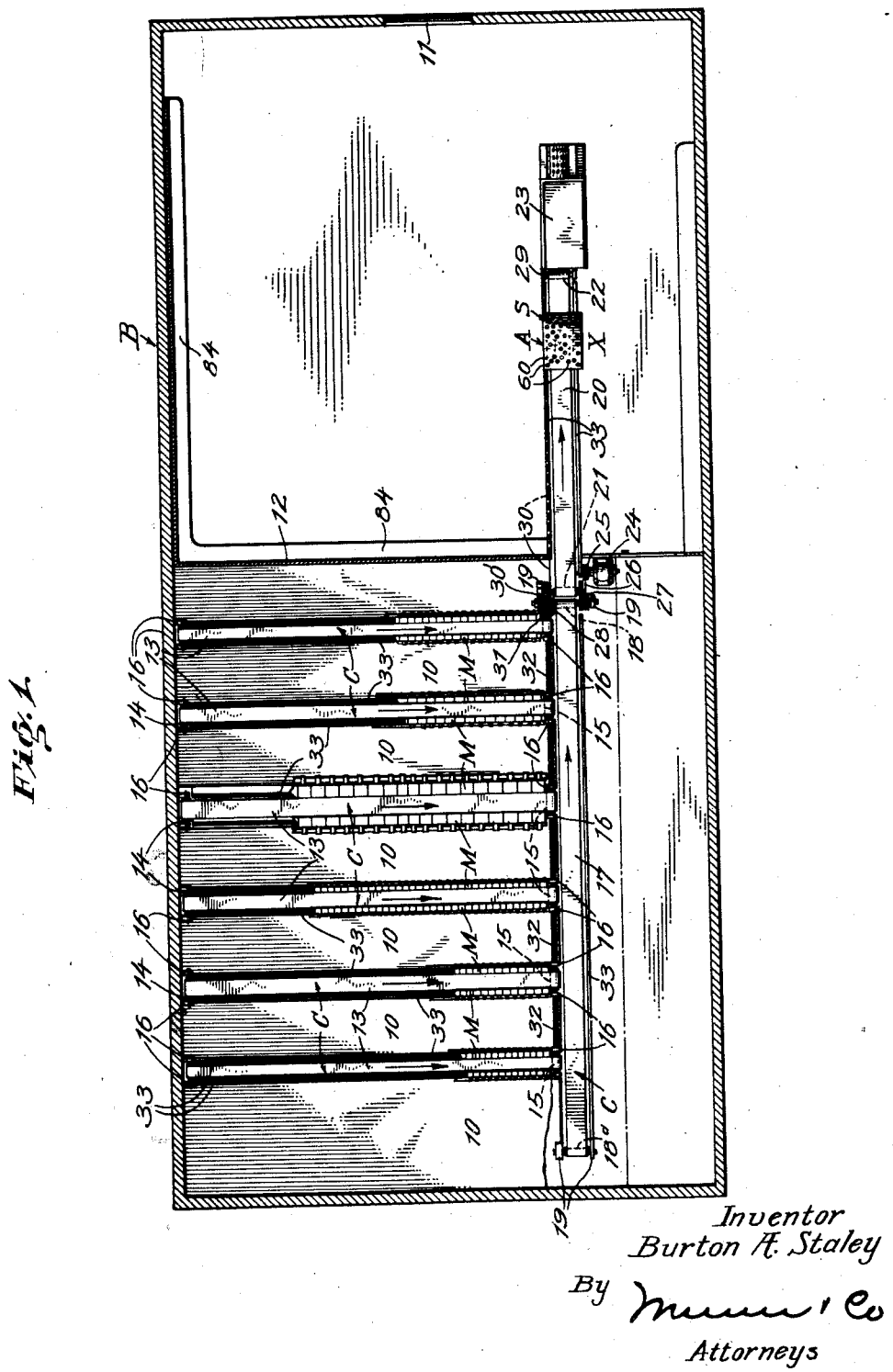

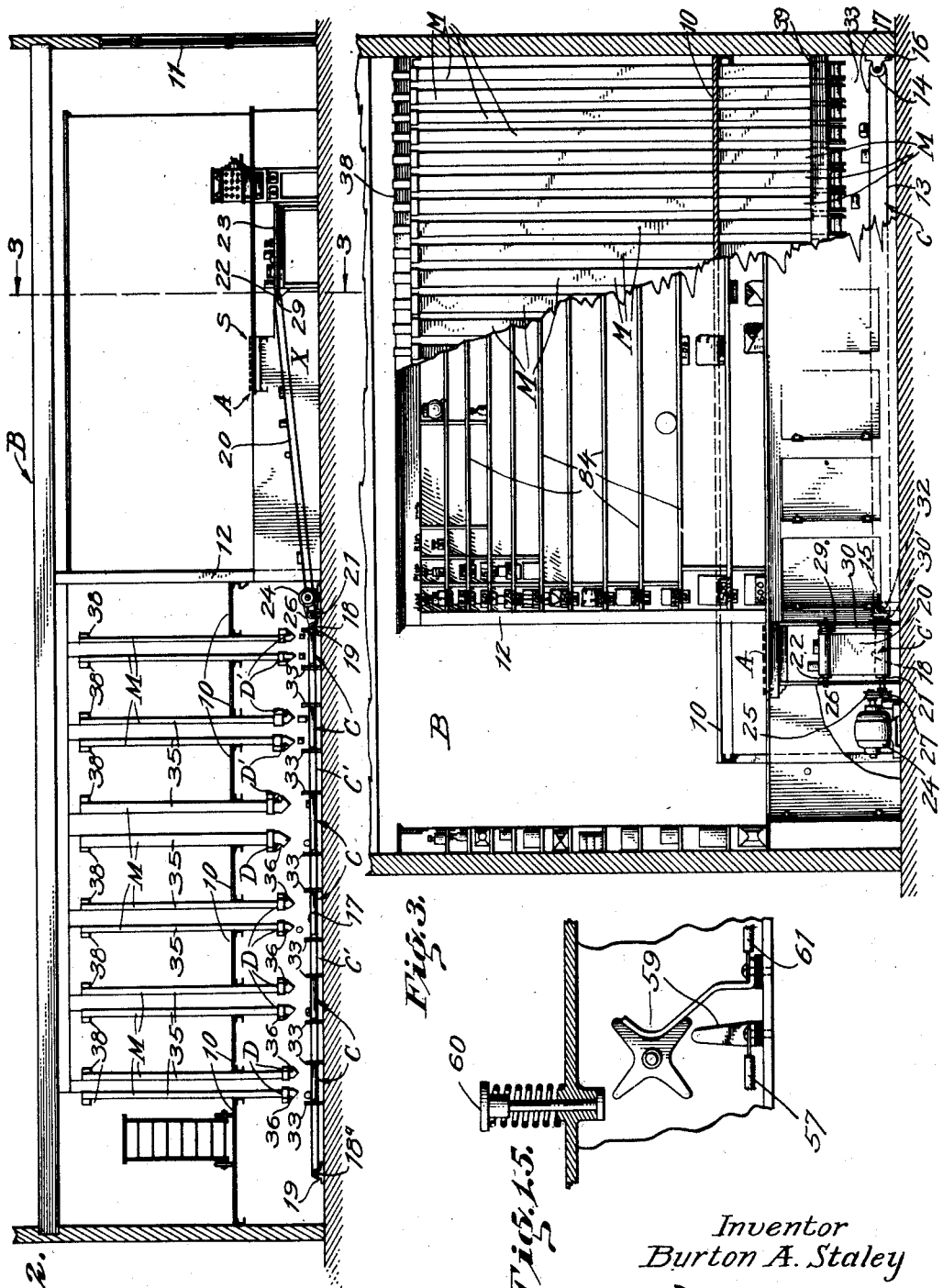

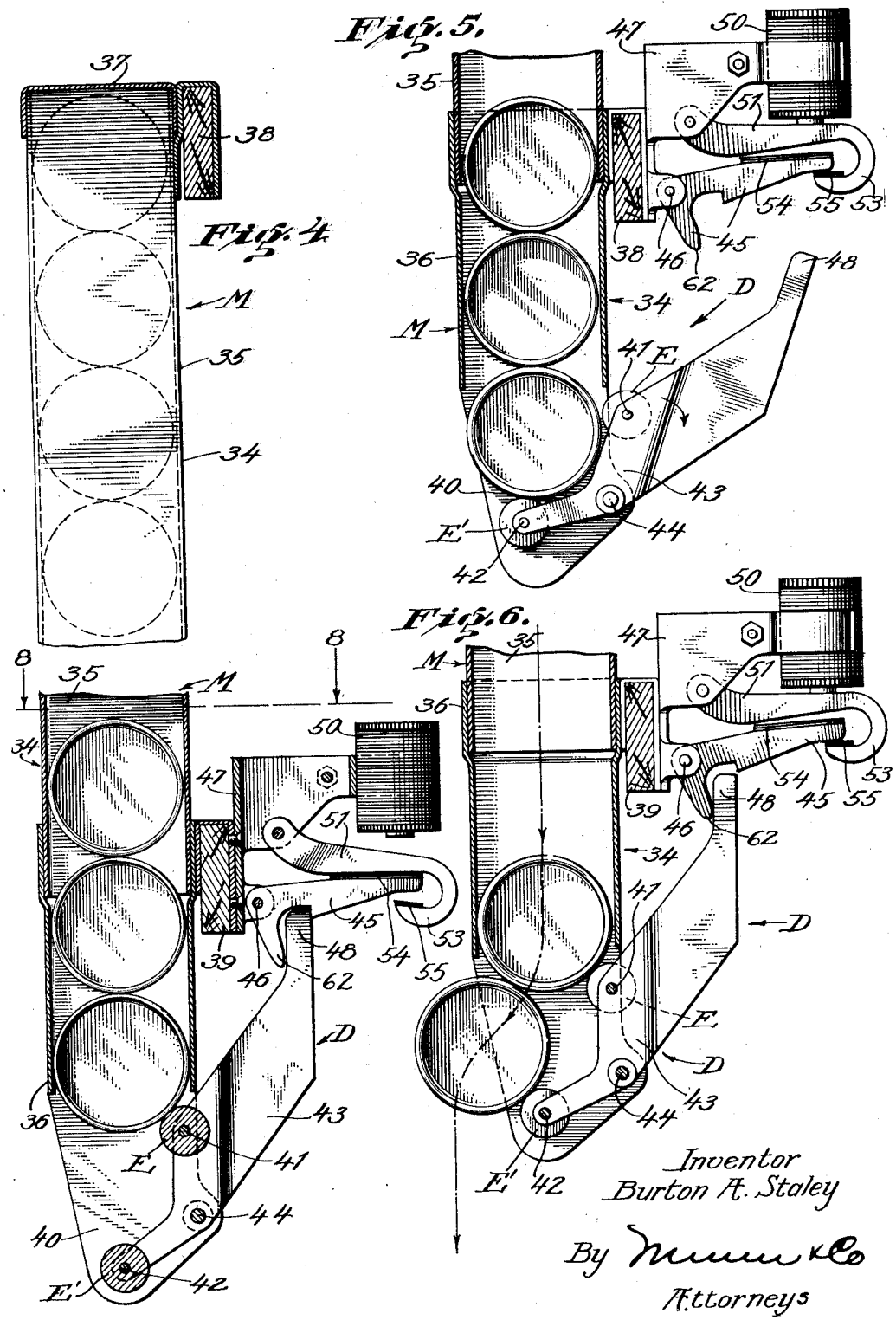

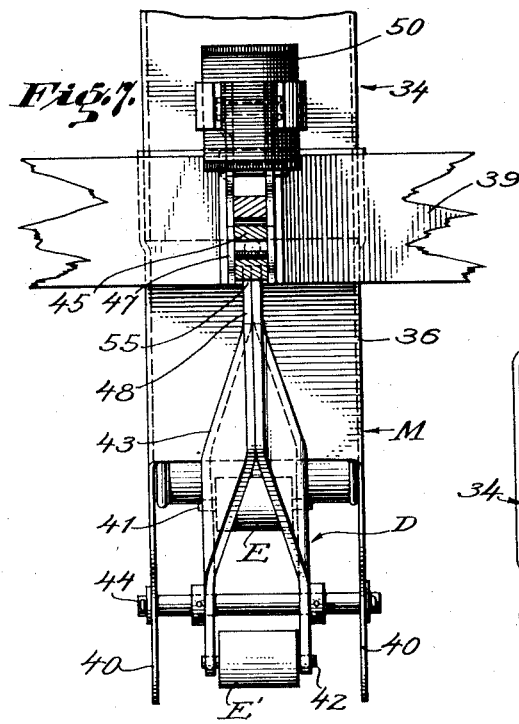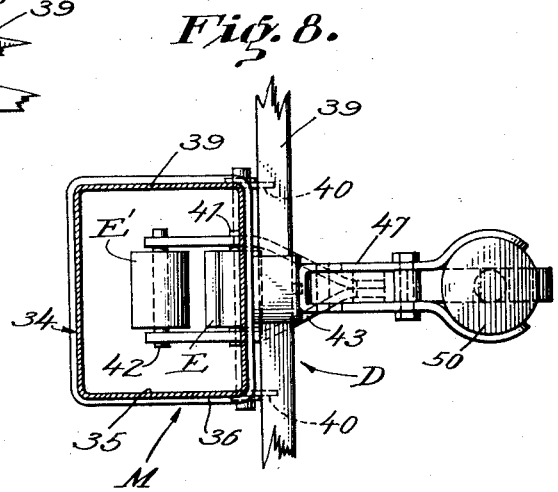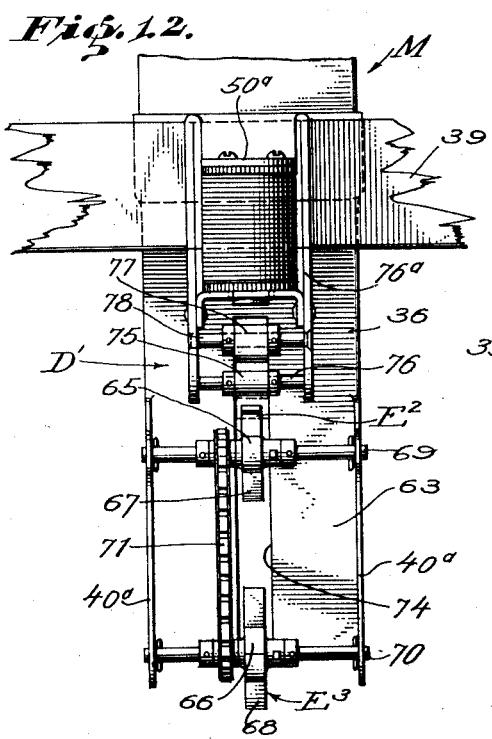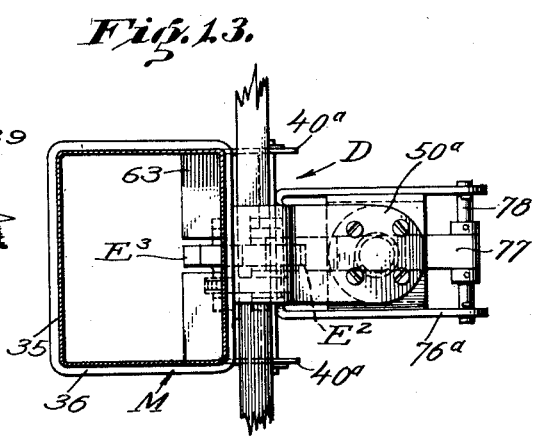

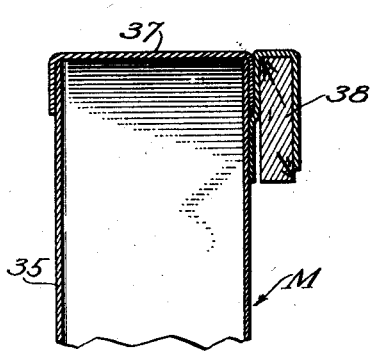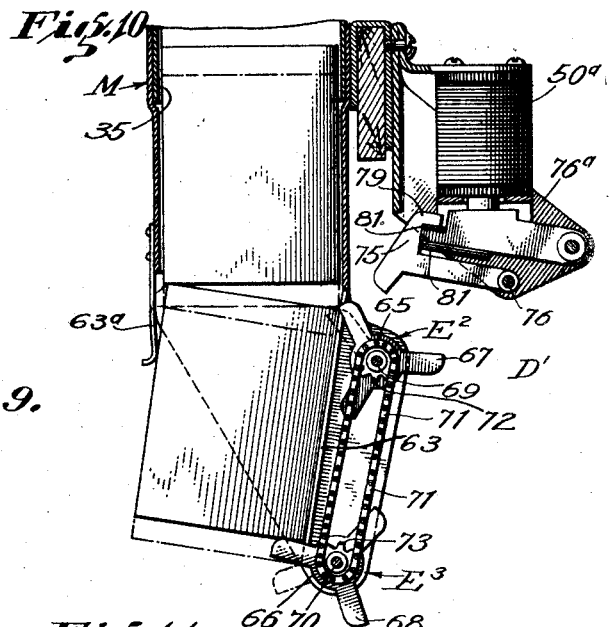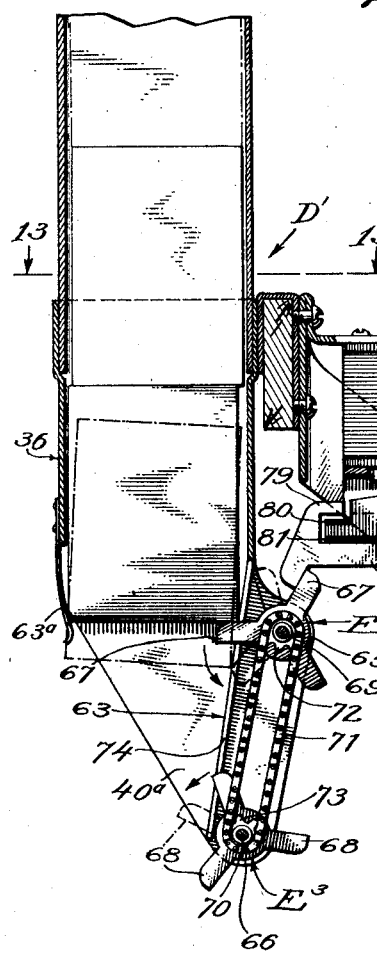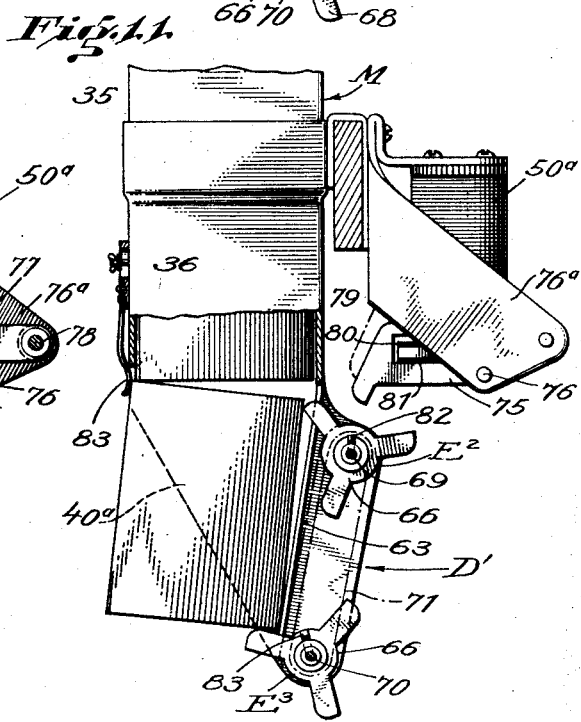

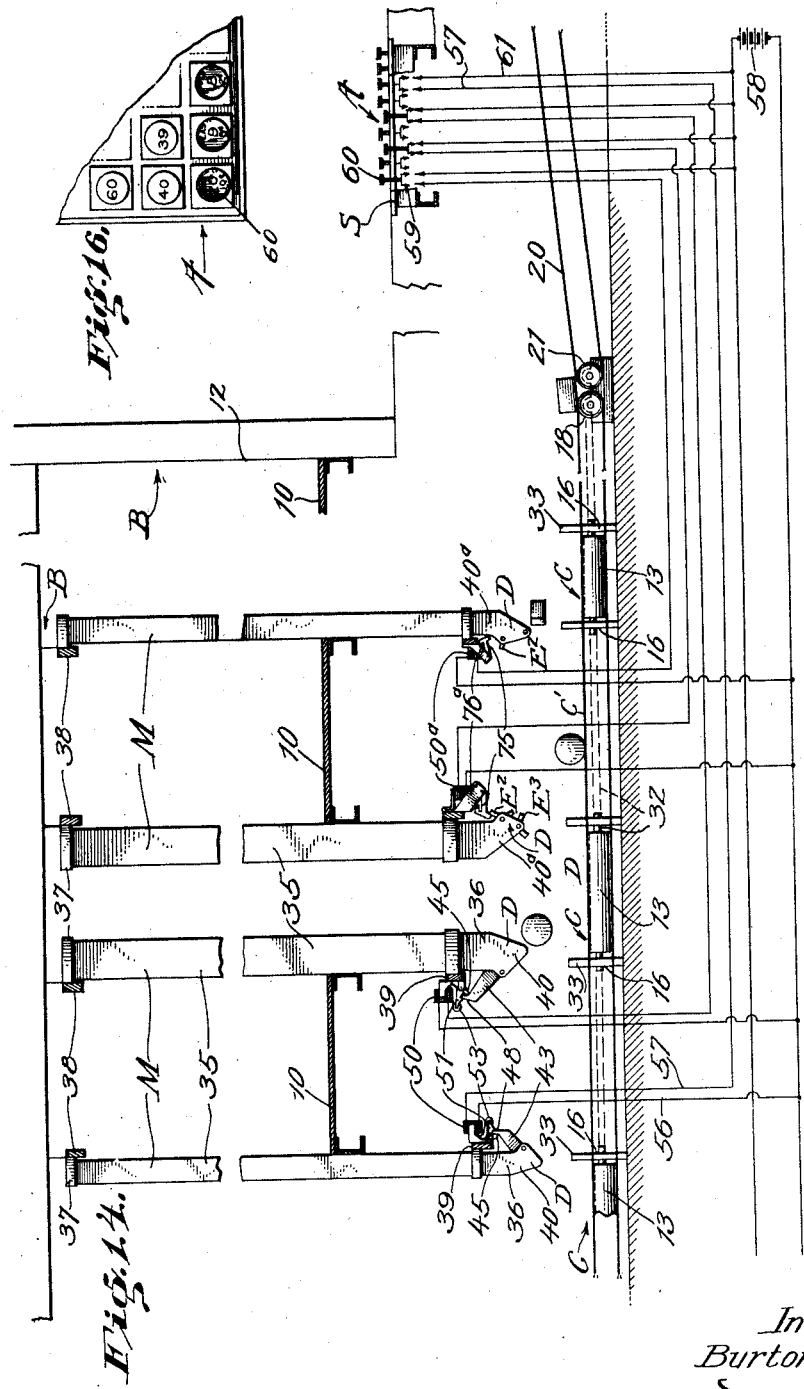

1,773,885

UNITED STATES PATENT OFFICE

BURTON A. STALEY, OF ORANGE, CALIFORNIA

ARTICLE-SERVING APPARATUS FOR STORES

Application filed February 6, 1929. Serial No. 337,997.

My invention relates to and has for a purpose the provision of an apparatus particularly adapted, although not necessarily, for use in stores handling packaged commodities such as canned goods and groceries for example, and by which both the customers and clerks will be relieved of the necessity of walking about in the store to reach and remove from their various places of storage, the articles carried in stock and desired by the customer, all in such manner that the serving of the customer will be accomplished with the utmost ease and dispatch by the delivery of the purchased articles automatically to a predetermined location in the store convenient to the customer and the clerk serving the latter.

My apparatus preferably includes a multiplicity of magazines distributed about the premises, and in which the articles of merchandise are stored; with mechanisms under the control of an operator stationed at a predetermined location, operable to dispense articles from the magazines selectively, for delivery by suitable conveyors to the proximity of the operator; it only being necessary for the customer to specify the particular articles in stock desired, after which the operator, by selecting and actuating the controls for the dispensing mechanisms of those magazines containing the articles ordered, will cause the ordered articles to be automatically dispensed from their respective magazines and conveyed to the operator for delivery to the customer.

It is another purpose of my invention to provide an article dispensing mechanism operable to dispense articles from a magazine under the action of the weight of the articles; with a control means for the dispensing mechanism by which the latter can be operated to effect the dispensing of articles singly from the magazine.

I will describe only one form of article serving apparatus for stores and two forms of article dispensing mechanisms, all embodying my invention, and will then point out the novel features thereof in claims.

In the accompanying drawings,

Fig. 1 is a view showing in plan one form of article serving apparatus for stores embodying my invention in its association with a building.

Fig. 2 is a view in side elevation of the article serving apparatus shown in Fig. 1;

Fig. 3 is a vertical sectional view taken on the line 3—3 of Fig. 2 and looking in the direction of the arrows;

Figs. 4, 5 and 6 are enlarged fragmentary vertical sectional views illustrating in different positions one form of article dispensing mechanism embodied in my article serving apparatus;

Fig. 7 is a fragmentary view in front elevation partly broken away of the article dispensing mechanism shown in Figs. 4, 5 and 6;

Fig. 8 is a horizontal sectional view taken on the line 8—8 of Fig. 4 and looking in the direction of the arrows.

Figs. 9, 10 and 11 are enlarged fragmentary vertical sectional views illustrating in different positions another form of article dispensing mechanism embodied in my article serving apparatus.

Fig. 12 is a view in front elevation of the article dispensing mechanism shown in Figs. 9, 10 and 11.

Fig. 13 is a horizontal sectional view taken on the the line 13—13 of Fig. 9 and looking in the direction of the arrows;

Fig. 14 is a diagrammatic view illustrating a typical portion of an electric controlling and selecting mechanism for a multiplicity of the article dispensing mechanisms embodied in my invention.

Fig. 15 is an enlarged detail view of a switch typical of a number of switches embodied in the electric controlling and selecting mechanism, and Fig. 16 is a fragmentary plan view of a portion of the electric controlling and selecting mechanism.

Referring specifically to the drawings in which similar reference characters designate similar parts in each of the several views, my invention in its present embodiment comprises a multiplicity of vertically disposed magazines M preferably arranged and supported within a building B in parallel rows transversely of the building; with sufficient space spanned by platforms 10 between each pair of rows of magazines to permit access thereto for the storing of articles in the magazines in stack formation, as well as replenishing of the supply of articles when exhausted. Each of the magazines is provided at its lower extremity with a mechanism by which articles in the respective magazines are dispensed therefrom; certain of the mechanisms being adapted for the dispensing of cylindrically shaped articles and being designated generally at D, and others being adapted for the dispensing of angularly shaped articles and being designated generally at D¹.

The article dispensing mechanisms are individually controlled to dispense articles from their respective magazines by a control mechanism designated generally at A and actuatable by an operator at a single location preferably adjacent or convenient to the entrance opening 11 of the building B and remote from the magazines, which latter are concealed from the view of the customer by a partition 12 spanning the building B transversely in advance of the foremost row of magazines.

Disposed below and common to each pair of rows of magazines M is a conveyor C in the form of an endless belt 13 trained over rollers 14 and 15 journaled in bearings 16. The belt 13 is horizontally disposed with its upper stretch positioned with respect to the dispensing mechanisms D or D¹, for the depositing of articles thereon as dispensed from the magazines.

Articles deposited on the belts 13 and conveyed by the latter when driven in the direction of the arrows (Fig. 1) are adapted to discharge from one end of the belts onto a conveyor C¹ in the form of an endless belt 17 disposed at right angles to and in the same horizontal plane as the belts 13. The belt 17 is trained about rollers 18 and 18ᵃ journaled in bearings 19; and articles conveyed by the belt 17 when driven in the direction of the arrow (Fig. 1) are adapted to discharge onto the upper stretch of another endless conveyor belt 20 forming a continuation and extending upwardly on an incline from the conveyor belt 17. The belt 20 is trained about rollers 21 and 22 journaled in suitable bearings; and articles conveyed by the belt 20 when driven in the same direction as the belt 17 are adapted to discharge therefrom onto a suitable table 23 or other elevated support in proximity to the control mechanism A so that an operator stationed at the latter in the position indicated at X can view the articles as well as wrap the latter for delivery to the customer.

The belts 13, 17 and 20 are preferably driven from an electric motor 24, to the shaft of which is fixed a pulley 25 having a belt 26 trained thereabout and also trained about a pulley 27 fixed to the roller 18 so as to drive the belt 17; while a second pulley 28 is fixed to the roller 18 and drives a pulley 29 fixed to the roller 22, by means of a belt 30 trained about the pulleys 28 and 29 so that the conveyor belt 20 will also be driven with and in the same direction as the belt 17.

The belts 13 are all simultaneously driven with the belts 17 and 20 by means of a pair of constantly meshing bevel gears 30 and 31, the former being fixed to the roller 18 and the latter fixed to a shaft 32 journaled in the bearings 16 and to which shaft the roller 15 of each of the belts 13 is fixed. With the motor 24 in operation, the belts 13, 17 and 20 will thus be simultaneously driven in the direction of their respective arrows (Fig. 1) so that articles from the magazines M, deposited on the belts 13 will be conveyed to and discharged onto the table 23. Articles on the various belts are confined against displacement therefrom during transit by means of side walls 33 which co-operate with the upper stretch of the respective belts to form a trough.

Referring now to Figs. 4, 5, 6, 7 and 8 I have herein shown one form of article dispensing mechanism D which is particularly adapted for the dispensing of cylindrical articles such as canned goods. It will be noted that the magazines M are each in the form of a tube 34 of such transverse section as to freely receive and support articles therein in a single stack formation, and that each magazine is constructed in an upper section 35 telescopically associated with a lower section 36 to permit disconnection of the sections for the supplying of articles thereto. The upper sections of the magazines are closed by removable caps 37 and are supported by horizontal bars 38 each of which is common to a row of magazines, while the lower sections of the magazines are supported by bars 39, each of which is common to a row of magazines. The lower end of the lower section 36 of each magazine is open and the lower sections of those magazines to contain cylindrical articles dispensed by the mechanism shown in Figs. 4, 5, 6, 7 and 8, are provided on two opposed sides with depending extensions 40 which serve as lateral guides for articles during the dispensing thereof by the mechanism.

The article dispensing mechanism shown in Figs. 4, 5, 6, 7 and 8 comprises a pair of abutment elements E and E¹ preferably in the form of rollers rotatably mounted on pins 41 and 42 respectively, carried by a member 43 in the form of a yoke pivotally mounted between the extensions 40 on a pin 44 intermediate the pins 41 and 42, to dispose the abutment elements E and E¹ one above the other. With the member 43 occupying the position shown in Fig. 4, the lowermost article in the magazine M rests upon the upper abutment element E to retain the articles in the magazine against discharge therefrom, and tends to rock the member 43 to the position shown in Fig. 5 wherein the upper abutment element E permits passage of the lowermost article under its weight and that of the remaining articles in the magazine.

In the position of the member 43 shown in Fig. 5, the lower abutment element E¹ is disposed in the path of movement of the lowermost article so that the latter in discharging from the magazine, will strike the lower abutment element E¹ and will reversely rock the member 43 to restore the latter to its initial position as shown in Fig. 6, in which position the next succeeding lowermost article in the magazine will rest upon the upper abutment element E to prevent further discharge of articles from the magazine.

The member 43 is normally releasably retained in the position shown in Fig. 4 by a latch 45 pivoted at 46 on a bracket 47 secured to one of the bars 39, and normally urged by gravity into latching engagement with a latching lug 48 formed on the upper end of the member as clearly shown in Fig. 4.

The latch 45 is adapted to be moved to its non-latching position shown in Fig. 5 to release the member 43, by an electromagnet 50 secured to the bracket 47 and having an armature 51 pivoted at 52 on the bracket, and provided at its free extremity with a hook 53 receiving the free extremity of the latch 45, the latter being insulated from the armature by strips of insulated material 54 and 55, the former being secured to the latch and the latter to the armature.

The magnet 50 is adapted to be momentarily energized to attract the armature 51 and momentarily move the latch 45 to its non-latching position so as to effect a single actuation of the member 43 and the discharge of a single article from the magazine. To this end and as shown in Fig. 14, the magnet is in series with conductors 56 and 57, the former connected to one side of a battery 58, and the latter to one side of a switch 59 (Fig. 15) normally open and adapted to be momentarily closed by the depression of a push button 60 to momentarily complete the circuit through a conductor 61 connecting the other side of the switch with the other side of the battery 58.

With the parts of the article dispensing mechanism above described, in the position shown in Fig. 4 it will be clear that upon a momentarily closing of the switch 59, the magnet 50 will be momentarily energized to attract the armature 51 and release the member 43 from the latch 45 to permit a single article to discharge from the magazine. Should the armature 51 on the latch 45 for any reason stick in the position shown in Fig. 5, following momentary energization of the magnet, an angular extension 62 formed on the latch will be struck by the latching lug 48 as the member 43 is restored by the discharging article to its initial position shown in Fig. 4, so as to positively restore the latch to its latching position and hence the armature to the position shown in Fig. 4, through the medium of the hooked engagement of the armature and latch. The dispensing of a single article from the magazine as a result of the momentary closing of the switch 59 will thus be insured.

Referring now to Figs. 9, 10, 11, 12 and 13 I have herein shown another form of article dispensing mechanism D¹ particularly adapted for the dispensing of angular shaped articles such as square and rectangular boxes and cartons of commodities. The lower sections 36 of all magazines from which articles of such shapes are to be dispensed are provided at their lower open ends with depending extensions 40ª which serves as lateral guides for articles during the dispensing thereof by the mechanism.

The extensions 40ª are spanned and connected by a plate 63 disposed at a slight angle to and forming a continuation of one side wall of the lower section 36 of the magazine. The plate broadly forms a guide, operating to slightly tilt the lowermost article in the magazine during its discharge from the latter, and thus provide a wedge shaped space opening to one side of and between the lowermost article and the next succeeding article as clearly shown in Fig. 10, for a purpose to be hereinafter described. A spring 63ª, fixed to the opposite side wall of the lower section 36 exerts yielding pressure against the side of the discharging article opposite to the plate 63, and operates to maintain the discharging article in its tilted position.

The form of article dispensing mechanism shown in Figs. 9, 10, 11, 12 and 13 comprises a pair of abutment elements E² and E³ in the form of rollers 65 and 66 respectively, having pluralities of circumferentially spaced fingers 67 and 68 respectively, equally spaced and projecting radially from the rollers. The rollers are fixed respectively, to shafts 69 and 70 journaled one above the other in parallel spaced relation in the depending extensions 40ª at the outer side of the plate 63, to dispose the rollers between the extensions.

The abutment elements E¹ and E² are operatively connected for rotary movements in a predetermined timed relationship by means of an endless chain 71 trained about sprockets 72 and 73 fixed respectively to the shafts 69 and 70 so that rotation of one shaft will effect rotation of the other in the same direction.

The plate 63 is provided with a slot 74 freely receiving the fingers 67 and 68; and in the positions of the elements E² and E³ shown in full lines in Fig. 9, the lowermost article in the magazine rests at one side upon one of the fingers 67 of the upper elements $E^2$ and tends to rotate the latter and hence the lower element $E^3$ through the sprocket and chain connection, in a counter-clockwise direction to the position shown in broken lines in Fig. 9 wherein the above mentioned finger 67 of the upper element has been moved sufficiently to permit the downward passage and discharge of the article from the magazine, and one of the fingers 68 of the lower element $E^3$ has been moved to dispose itself in the path of movement of the discharging article as also shown in broken lines in Fig. 9, so as to be struck by the latter and moved sufficiently for the next succeeding finger 67 of the upper element $E^2$ to enter the wedge shaped space formed between the discharging article and the next succeeding article, as is clearly shown in Fig. 10. Continued rotation of the elements $E^2$ and $E^3$ by the discharging article from the position shown in Fig. 10, will restore the elements to the position shown in full lines in Fig. 9, with the next succeeding lowermost article in the magazine resting upon the above mentioned succeeding finger 67 of the upper element $E^2$.

The elements $E^2$ and $E^3$ are releasably retained in the position shown in full lines in Fig. 9, against the normal tendency of the weight of articles in the magazine to actuate the elements and discharge the articles from the magazine, by a latch 75 pivoted at 76 on a bracket $76^a$ secured to the lower section 36 of the magazine. The latch 75 normally gravitates to a position in the path of movement of the fingers 67 of the upper element $E^2$ so as to be engaged by the finger 67 next succeeding the one on which rests the lowermost article in the magazine as is clearly shown in full lines in Fig. 9.

The latch 75 is adapted to be moved to the non-latching position shown in Fig. 10 so as to release the elements $E^2$ and $E^3$, by an electro-magnet $50^a$ secured to the bracket $76^a$ and having an armature 77 pivoted at 78 on the bracket, the latch having a hook 79 receiving the free extremity of the armature so as to be moved by the latter, and being insulated from the armature by means of strips of insulating material 80 and 81. As is shown in Fig. 14, the magnet $50^a$ is included in a circuit identical to that previously described in conjunction with the magnet 50 of a dispensing mechanism D for dispensing cylindrically shaped articles, and is controlled by a switch identical to the switch 59 previously described, so as to effect a momentary release of the abutments $E^2$ and $E^3$ in response to a momentary energization of the magnet $50^a$, and thus cause the dispensing of a single article from the respective magazine.

As the magnet 50 or $50^a$ of each dispensing mechanism D or $D^1$ respectively is included in such a circuit and each circuit controlled individually by a switch 59, as shown in Fig. 14, it will be clear that with all the switches positioned to group their respective push buttons 60 on a support S in close proximity to the table 23, that an operator positioned at X in Fig. 1 can conveniently actuate any of the switches individually to cause the dispensing of articles from their respective magazines.

In conjunction with the description of the form of article dispensing mechanism shown in Figs. 9, 10, 11, 12 and 13, and by reference particularly to Fig. 11, it will be noted that the abutment elements $E^2$ and $E^3$ are rendered circumferentially adjustable on their respective shafts 69 and 70 by means of set screws 82 and 83 respectively, to permit their relative positions to be varied to accommodate articles of different lengths, as well as to permit a finger 67 of the upper element $E^2$ to engage a side of the discharging article adjacent its upper edge as shown in Fig. 2, to effect a lateral ejection of the article as well as a downward discharge thereof, against the yielding retaining action of a spring 83 which in this mode of dispensing an article is substituted for the spring $63^a$.

The partition 12 for concealing the magazines M from view, is provided with shelves 84 for displaying to the customer one article of each of those carried in stock in the magazines M; and associated with each article is a numeral or other suitable identifying indicia. Each push button 60 is provided with indicia corresponding to the indicia of the particular article on the shelves 84 and in the magazine of the dispensing mechanism D or $D^1$ that such push button controls. For example, and assuming that a certain article displayed will be numbered 10, the particular push button 60 controlling the dispensing mechanism of the magazine containing like articles, will also be numbered 10. Other indicia may also be provided on the displayed articles and the push buttons, such as the price and character of the articles.

The general operation of the apparatus is as follows:

Assuming that the magazines M are all provided with a stock of articles corresponding to those displayed on the shelves 84, and with the motor 24 in operation, it is only necessary for a customer to call or give to the operator stationed at X (Fig. 1) a list of numbers or other identifying indicia borne by those articles displayed on the shelves 84 and desired by the customer, after which the operator, by selecting and depressing those push buttons 60 bearing corresponding numbers, will cause the dispensing from their respective magazines, of the articles ordered, which are deposited from their respective magazines onto the conveyor belts 13 and conveyed therefrom automatically to the table 23 for delivery to the waiting customer. The necessity of either the clerks or customers walking about in the store in order to reach and remove from their places of storage, the articles desired by the customers, will thus be obviated, and this service performed automatically and with the utmost dispatch. The magazines are preferably of sufficient capacity to store the number of articles required to fill the demands of a day's business, so that the magazines need only be stocked once a day.

Although I have herein shown and described only one form of article serving apparatus for stores and two forms of article dispensing mechanisms embodying my invention, it is to be understood that various changes and modifications may be made therein without departing from the spirit of the invention and the spirit and scope of the appended claims.

I claim:

1. In combination, a magazine for containing articles in stack formation; upper and lower abutment elements; means for mounting said elements for movement to occupy one position wherein the lowermost article in the magazine rests against the upper element to prevent the discharge of articles from the magazine, and tends to move the elements to a second position wherein the lowermost article is free to pass the upper element and the lower element is disposed in the path of movement of the discharging article for striking by the latter to restore the elements to the first mentioned position and thereby prevent further discharge of articles from the magazine; means for releasably retaining the elements in the first mentioned position; and means for releasing the elements for movement to the second mentioned position.

2. In combination, a magazine for containing articles in stack formation; upper and lower abutment elements; means for mounting said elements for movement to occupy one position wherein the lowermost article in the magazine rests against the upper element to prevent the discharge of articles from the magazine, and tends to move the elements to a second position wherein the lowermost article is free to pass the upper element, and the lower element is disposed in the path of movement of the discharging article for striking by the latter to restore the elements to the first mentioned position and thereby prevent further discharge of articles from the magazine; means for latching the elements in the first mentioned position; and means for actuating the latching means to release the elements comprising an electromagnet; and an armature for the magnet insulated from the latching means and so engageable with the latter as to move the latching means to non-latching position when said magnet is energized.

3. In combination, a magazine for containing articles in stack formation; a pair of abutment elements, each having a plurality of circumferentially spaced fingers; means for mounting the elements in spaced relation one above the other for rotary movement; means for operatively connecting the elements to effect rotation thereof in a predetermined timed relationship to occupy one position wherein the lowermost article in the magazine rests upon a finger of the upper element, and tends to move the elements to a second position wherein the lowermost article is free to pass said finger of the upper element and a finger of the lower element is disposed in the path of movement of the discharging article for striking by the latter to further rotate the elements sufficiently for another of the fingers of the upper element to be positioned for the resting thereon of the next succeeding article in the magazine; means for releasably retaining the abutment elements in the first mentioned position; and means for releasing the elements for the aforestated movements under the weight of an article.

4. The combination as embodied in claim 3 wherein means is provided for tilting the article discharging from the magazine, sufficiently with respect to the next succeeding article, to provide space between said two articles for the entrance of the fingers of the upper abutment element.

5. The combination as embodied in claim 3 wherein said latching means comprises a latch having latching engagement with a finger of the upper abutment element.

6. The combination as embodied in claim 3 wherein said latching means comprises a latch having latching engagement with a finger of the upper abutment element, and said releasing means comprises an electro-magnet; and an armature therefor insulated from the latch and so engageable with the latter as to move the latch to a non-latching position when the magnet is energized.

7. In combination, a magazine for containing articles in stack formation; a pair of abutment elements, each having a plurality of circumferentially spaced fingers; means for mounting the elements in spaced relation one above the other for rotary movement; means for operatively connecting the elements to effect rotation thereof in a predetermined timed relationship to occupy one position wherein the lowermost article in the magazine rests upon a finger of the upper element, and tends to move the elements to a second position wherein the lowermost article is free to pass said finger of the upper element and a finger of the lower element is disposed in the path of movement of the discharging article for striking by the latter to further rotate the elements sufficiently for another of the fingers of the upper element to engage a side of the discharging article to eject the latter from the magazine laterally and to then be positioned for the resting thereon of the next succeeding article in the magazine; means for releasably retaining the abutment elements in the first mentioned position; and means for releasing the elements for the aforestated movements under the weight of articles in the magazine.

8. In combination, a magazine for containing articles in stack formation and having its lower portion inclined relatively to the portion thereabove to cause the lowermost article in the magazine when discharging from the latter to tilt laterally with respect to the next succeeding article and thereby provide a space between said two articles at one side of the latter; a pair of abutment elements, each having a plurality of circumferentially spaced fingers; means for mounting said elements in spaced relation one above the other for rotary movement about fixed axes; means for operatively connecting said elements to effect rotation thereof in a predetermined timed relationship to occupy one position wherein the lowermost article in the magazine rests upon a finger of the upper element to retain the articles in the magazine, and tends to move the elements to a second position wherein the lowermost article is free to pass said finger of the upper element, and a finger of the lower element is disposed in the path of movement of the discharging article for striking by the latter to further rotate the elements sufficiently for another of the fingers of the upper element to enter the space between the discharging article and the next succeeding article for the resting of the latter upon the finger; means for releasably retaining said abutment elements in the first mentioned position; and means for releasing the elements for the aforestated movements under the weight of articles in the magazine.

Signed at Los Angeles, in the county of Los Angeles, and State of California, this 25th day of January, A. D. 1929.

BURTON A. STALEY.